US009763100B2

(12) United States Patent
Tang et al.

(10) Patent No.: US 9,763,100 B2
(45) Date of Patent: Sep. 12, 2017

(54) INSTANT MESSAGING MESSAGE PROCESSING METHOD AND DEVICE AND STORAGE MEDIUM

(71) Applicant: TENCENT TECHNOLOGY (SHENZHEN) COMPANY LIMITED, Guangdong (CN)

(72) Inventors: Yanping Tang, Guangdong (CN); Meng Chen, Guangdong (CN); Rong Chen, Guangdong (CN); Yuanbin Chen, Guangdong (CN); Zengxin Sun, Guangdong (CN); Feifei Liu, Guangdong (CN); Liang Dong, Guangdong (CN); Dechun Li, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 85 days.

(21) Appl. No.: 14/816,422

(22) Filed: Aug. 3, 2015

(65) Prior Publication Data

US 2015/0341795 A1 Nov. 26, 2015

Related U.S. Application Data

(63) Continuation of application No. PCT/CN2014/086057, filed on Sep. 5, 2014.

(30) Foreign Application Priority Data

Nov. 18, 2013 (CN) .......................... 2013 1 0581290

(51) Int. Cl.
*G06F 11/00* (2006.01)
*G06F 12/14* (2006.01)
(Continued)

(52) U.S. Cl.
CPC ............. *H04W 12/12* (2013.01); *H04L 51/04* (2013.01)

(58) Field of Classification Search
CPC ....................................................... H04L 51/04
(Continued)

(56) References Cited

U.S. PATENT DOCUMENTS

2008/0229415 A1* 9/2008 Kapoor ................... G06F 21/55
726/22
2009/0006532 A1 1/2009 Sinn et al.
2009/0249465 A1* 10/2009 Touboul .................. G06F 21/57
726/11

FOREIGN PATENT DOCUMENTS

| CN | 102163194 A | 8/2011 |
| CN | 102394838 A | 3/2012 |
| CN | 103001856 A | 3/2013 |

OTHER PUBLICATIONS

English Abstract of CN102163194 (A).
(Continued)

*Primary Examiner* — Taghi Arani
*Assistant Examiner* — Khalil Naghdali
(74) *Attorney, Agent, or Firm* — Anova Law Group, PLLC

(57) ABSTRACT

An instant messaging message processing method is disclosed and includes: receiving, by a server, an instant messaging message, user account information of a destination user terminal, and user account information of a source user terminal from the source user terminal; determining, by the server, a risk level of the instant messaging message according to a preset rule and the user account information of the source user terminal; and if the risk level of the instant messaging message reaches a first risk level, transmitting, by the server when, the instant messaging message and preset pre-warning information to the destination user terminal (Continued)

according to the user account information of the destination user terminal, wherein the pre-warning information comprises security prompt information which is used for prompting a user of the destination user terminal to notice a security risk of the instant messaging message. An instant messaging message processing device is also disclosed.

20 Claims, 10 Drawing Sheets

(51) Int. Cl.
    *G06F 12/16*       (2006.01)
    *G08B 23/00*       (2006.01)
    *H04W 12/12*       (2009.01)
    *H04L 12/58*       (2006.01)

(58) Field of Classification Search
    USPC .......................................................... 726/22
    See application file for complete search history.

(56) References Cited

OTHER PUBLICATIONS

English Abstract of CN102394838 (A).
English Abstract of CN103001856 (A).
International Search Report for PCT/CN2014/086057 mailed Dec. 16, 2014.

* cited by examiner

INSTANT MESSAGING MESSAGE PROCESSING METHOD AND DEVICE AND STORAGE MEDIUM

CROSS-REFERENCE TO RELATED APPLICATIONS

This application claims priority to and is a continuation application of PCT/CN2014/086057, filed on Sep. 5, 2014 and entitled "INSTANT MESSAGING MESSAGE PROCESSING METHOD AND DEVICE AND STORAGE MEDIUM", which claims priority to Chinese Patent Application No. 201310581290.9, filed on Nov. 18, 2013 in the name of Shenzhen Tencent Computer System Co., Ltd. and entitled "METHOD AND DEVICE FOR PROCESSING INSTANT MESSAGING MESSAGE", the present disclosures of which are incorporated herein by reference in their entirety.

TECHNICAL FIELD

Embodiments of the present disclosure relate to computer communication technologies, especially to an instant messaging message processing method and device and a storage medium.

TECHNICAL BACKGROUND

With the development of computer communication technologies and popularity of the Internet, information interaction via instant messaging clients has become one of important contact means among people nowadays. However, interacting parties generally receive only texts or multimedia information such as audio from the counterpart but cannot see appearance of the counterpart, thus malefactors can simulate a legal user identity of a stolen instant messaging account to perform a money fraud to a contact of the instant messaging account. Therefore, it is an essential subject to prompt a user to guarantee information safety in the process of instant messaging.

Nowadays, safety pre-warnings in instant messaging processes generally cannot accurately identify dangerous situations, resulting in low accuracy of the safety pre-warnings.

SUMMARY OF THE INVENTION

In view of the above, embodiments of the present disclosure provide an instant messaging message processing method and device and a storage medium, to improve the accuracy of the safety pre-warning.

On a first aspect, an embodiment of the present disclosure provides an instant messaging message processing method including: receiving, by a server, an instant messaging message, user account information of a destination user terminal, and user account information of a source user terminal from the source user terminal; determining, by the server, a risk level of the instant messaging message according to a preset rule and the user account information of the source user terminal; and if the risk level of the instant messaging message reaches a first risk level, transmitting, by the server when, the instant messaging message along with preset pre-warning information to the destination user terminal according to the user account information of the destination user terminal, wherein the pre-warning information includes security prompt information which is used for prompting a user of the destination user terminal to notice a security risk of the instant messaging message.

On a second aspect, an embodiment of the present disclosure further provides an instant messaging message processing method including: receiving, by a destination user terminal, an instant messaging message and pre-warning information from a server, wherein the pre-warning information includes security prompt information, verification information and report information, and the security prompt information is used for prompting a user of the destination user terminal to notice a security risk of the instant messaging message; presenting, by the destination user terminal, the instant messaging message and the pre-warning information to the user; and performing a corresponding operation, by the destination user terminal, in response to an operation performed by the user according to the verification information or the report information.

On a third aspect, an embodiment of the present disclosure further provides an instant messaging message processing device operatable on a server, including: a first receiving module, which is configured to receive an instant messaging message, user account information of a destination user terminal, and user account information of a source user terminal from the source user terminal; an analyzing module, which is configured to determine a risk level of the instant messaging message according to a preset rule and the user account information of the source user terminal; and a first processing module, which is configured to transmit the instant messaging message along with preset pre-warning information to the destination user terminal according to the user account information of the destination user terminal if the analyzing module determines that the risk level of the instant messaging message reaches a first risk level, wherein the pre-warning information includes security prompt information which is used for prompting a user of the destination user terminal to notice a security risk of the instant messaging message.

On a fourth aspect, an embodiment of the present disclosure further provides an instant messaging message processing device operatable on a destination user terminal, including: a second receiving module, which is configured to receive an instant messaging message and pre-warning information from a server, wherein the pre-warning information includes security prompt information, verification information and report information, and the security prompt information is used for prompting a user of the destination user terminal to notice a security risk of the instant messaging message; a presenting module, which is configured to present the instant messaging message and the pre-warning information received by the second receiving module to the user; and a processing module, which is configured to perform a corresponding operation in response to an operation that is performed by the user according to the verification information or the report information.

On a fifth aspect, an embodiment of the present disclosure further provides a storage medium including computer-executable instructions, where the computer-executable instructions, when being executed by a computer processor, are configured to execute an instant messaging message processing method, and the method includes:

receiving, by a server, an instant messaging message, user account information of a destination user terminal, and user account information of a source user terminal from the source user terminal;

determining, by the server, a risk level of the instant messaging message according to a preset rule and the user account information of the source user terminal; and if the risk level of the instant messaging message reaches a first risk level, transmitting, by the server when, the instant messaging message along with preset pre-warning information to the destination user terminal according to the user account information of the destination user terminal, wherein the pre-warning information includes security prompt information which is used for prompting a user of the destination user terminal to notice a security risk of the instant messaging message.

On a sixth aspect, an embodiment of the present disclosure further provides a storage medium including computer-executable instructions, where the computer-executable instructions, when being executed by a computer processor, are configured to execute an instant messaging message processing method, and the method includes:

receiving, by a destination user terminal, an instant messaging message and pre-warning information from a server, wherein the pre-warning information includes security prompt information, verification information and report information, and the security prompt information is used for prompting a user of the destination user terminal to notice a security risk of the instant messaging message;

presenting, by the destination user terminal, the instant messaging message and the pre-warning information to the user; and performing a corresponding operation, by the destination user terminal, in response to an operation performed by the user according to the verification information or the report information.

With the instant messaging message processing method and device and the storage medium provided by the embodiments of the present disclosure, the server determines the risk level of the instant messaging message received from the source user terminal according to a preset rule and the user account information of the source user terminal, and transmits the instant messaging message along with the preset pre-warning information to the destination user terminal according to the user account information of the destination user terminal if the risk level of the instant messaging message reaches the first risk level. Since the risk level of the instant messaging message is determined from multiple dimensionalities such as the preset rule and the user account information of the user terminal, the accuracy of determining the security risk level of the instant messaging message is improved. Further, by transmitting the pre-warning information to the destination user terminal while transmitting the instant messaging message with a high security risk to the destination user terminal, the pre-warning is more accurately targeted, thereby improving the accuracy of the security pre-warning, and effectively reducing the security risks brought to the user of the destination user terminal caused by a risky instant messaging message, thus achieving higher accuracy of the security pre-warning.

DESCRIPTION OF DRAWINGS

To describe technical schemes in embodiments of the present disclosure more clearly, accompanying drawings used in the description of the embodiments will be introduced briefly below. Of course, the accompanying drawings in the description below illustrate only some embodiments of the present disclosure, and those of ordinary skill in the art can also modify and substitute these drawings without creative work.

DETAILED DESCRIPTION OF THE PREFERRED EMBODIMENT

To further illustrate technical means adopted in the present disclosure to achieve a preset invention purpose and effects thereof, specific embodiments, structures, features and effects thereof according to the present disclosure are described below in detail as follows in combination with the accompanying drawings and exemplary embodiments.

Figure 1:
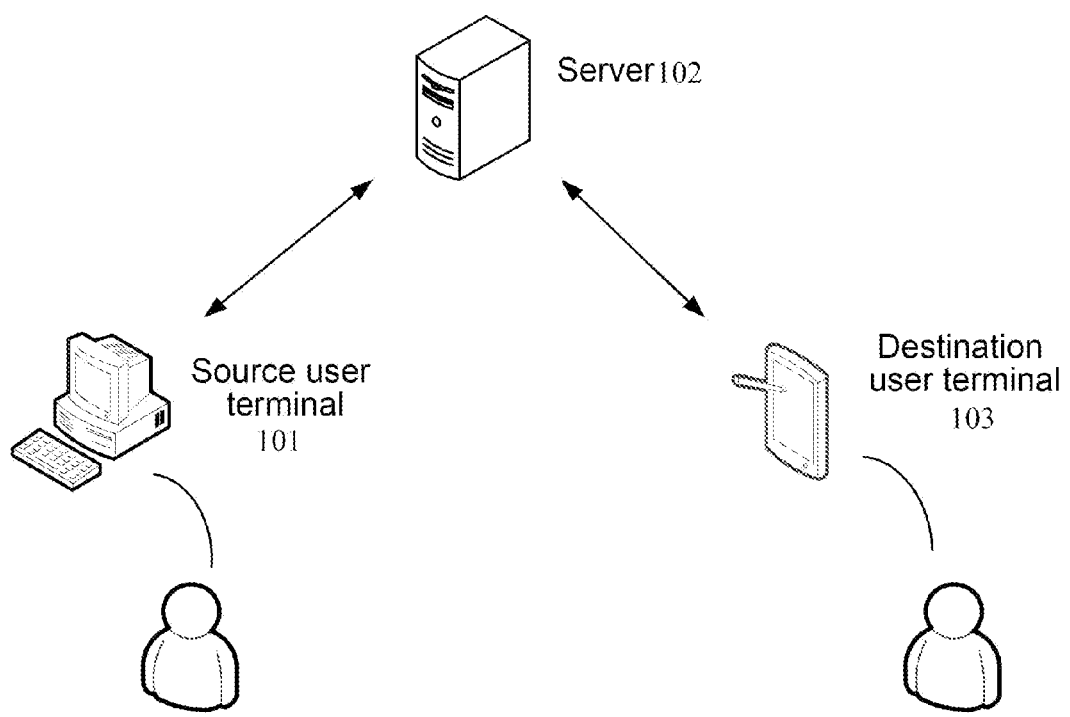
FIG. 1 is a diagram showing an environment of an instant messaging message processing method provided by an embodiment of the present disclosure.

An instant messaging message processing method provided by the first embodiment of the present disclosure is applicable in an environment as shown in FIG. 1. As shown in FIG. 1, a source user terminal 101, a server 102 and a destination user terminal 103 are located in a wireless network or a wired network, and the source user terminal 101, the server 102 and the destination user terminal 103 can perform information interaction via the wireless network or the wired network.

The source user terminal 101 and the destination user terminal 103 may include a smartphone, a tablet computer, an ebook reader, a Moving Picture Experts Group Audio Layer III (MP3) player, a Moving Picture Experts Group Audio Layer IV (MP4) player, a portable laptop computer, a vehicle-mounted computer, a desktop computer and the like.

Figure 2:
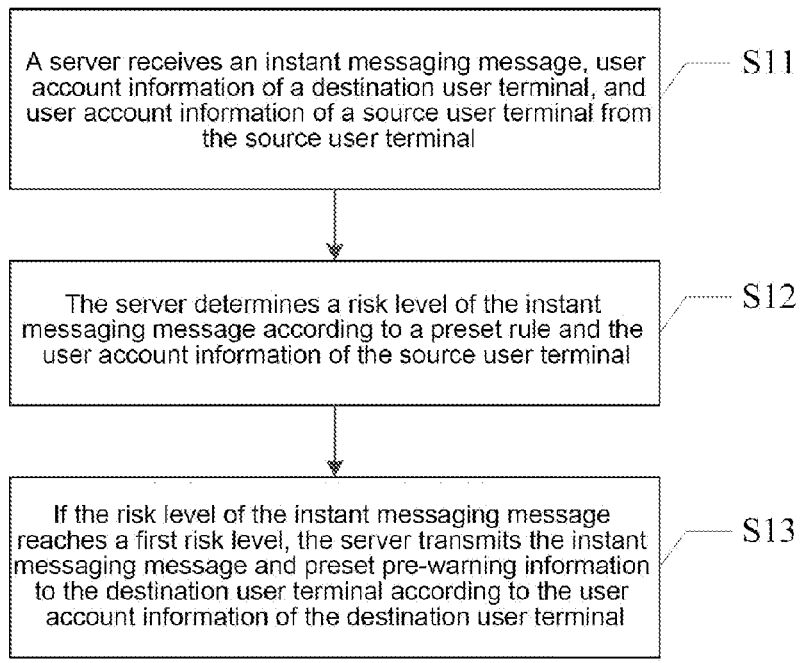
FIG. 2 is a flow chart of an instant messaging message processing method provided by a first embodiment of the present disclosure.

FIG. 2 is a flow chart of the instant messaging message processing method provided by the first embodiment of the present disclosure. As shown in FIG. 2, the instant messaging message processing method of this embodiment includes following Steps S11, S12 and S13.

Step S11: a server receives an instant messaging message, user account information of a destination user terminal, and user account information of a source user terminal from the source user terminal.

Specifically, the server 102 receives the instant messaging message, the user account information of the source user terminal 101, and the user account information of the destination user terminal 103, transmitted by the source user terminal 101.

The instant messaging message may include content information such as texts, pictures, audio or a website address of a video file. The user account information of the source user terminal 101 may be used for estimating the risk of the instant messaging message transmitted by the source user terminal 101. The user account information of the destination user terminal 103 is used by the server 102 to transmit the instant messaging message to the destination user terminal 103 if the risk level of the instant messaging message transmitted by the source user terminal 101 complies with a preset level.

Step S12: the server determines the risk level of the instant messaging message according to a preset rule and the user account information of the source user terminal.

In this step, the server may record historical login status of each user account so as to obtain a login regulation or a usage regulation of the user account according to a statistics of the login status, so that it is possible to determine whether the login of the user account is abnormal on the basis of the user account information. For example, in the case where a historical usage regulation of the user account shows that the login of the user account happens in working time, if it is found that the user account is logged in in small hours, then the server determines that the user account was logged in abnormally, and determines the risk level of the instant messaging message considering such abnormality.

Step S13: if the risk level of the instant messaging message reaches a first risk level, the server transmits the instant messaging message along with preset pre-warning information to the destination user terminal according to the user account information of the destination user terminal, where the pre-warning information includes security prompt information, which is used for prompting a user of the destination user terminal to notice a security risk of the instant messaging message.

In a specific implementation of this embodiment, the first risk level is defined as high security risk level, that is, if the risk level of the instant messaging message is determined to comply with the first risk level, there is a high possibility that the instant messaging message includes a fraud information content, in this case, the server 102 transmits a piece of preset information to the destination user terminal 103 while forwarding the instant messaging message to the destination user terminal 103, so as to prompt a user of the destination user terminal 103 to notice a security risk of the instant messaging message.

With the instant messaging message processing method provided by the present embodiment of the disclosure, the server determines the risk level of the instant messaging message received from the source user terminal according to a preset rule and the user account information of the source user terminal, and transmits the instant messaging message along with the preset pre-warning information to the destination user terminal according to the user account information of the destination user terminal if the risk level of the instant messaging message reaches the first risk level. Since the risk level of the instant messaging message is determined from multiple dimensionalities such as the preset rule and the user account information of the user terminal, the accuracy of determining the security risk level of the instant messaging message is improved. Further, by transmitting the pre-warning information to the destination user terminal while transmitting the instant messaging message with a high security risk to the destination user terminal, the pre-warning is more accurately targeted, thereby improving the accuracy of the security pre-warning, and effectively reducing the security risks brought to the user of the destination user terminal caused by a risky instant messaging message, thus achieving higher accuracy of the security pre-warning.

The technical scheme of the present embodiment of the disclosure can improve accuracy of security pre-warnings compared with the existing technology where a safety tip pops up in the system to prompt the user of the fact that the sender of a message may not be a real owner of the user account sending the message when the content of the message sent in instant communication includes a preset keyword that triggers the security pre-warning, to prompt the user to prevent a possible fraud. In the existing technology, logics of judging whether to present security pre-warnings by a backstage of the system is not good enough in that a prompt box is popped as long as a preset keyword appears, but the involvement of the preset keyword does not necessarily mean that the message with the preset keyword contains fraud information, hence there is a defect that the accuracy of the security pre-warning is low. The technical scheme of the present embodiment of the disclosure further introduces the user account information of the source user terminal to improve the logics in determining the risk level of the message and improve the accuracy of the security pre-warning.

Figure 3:
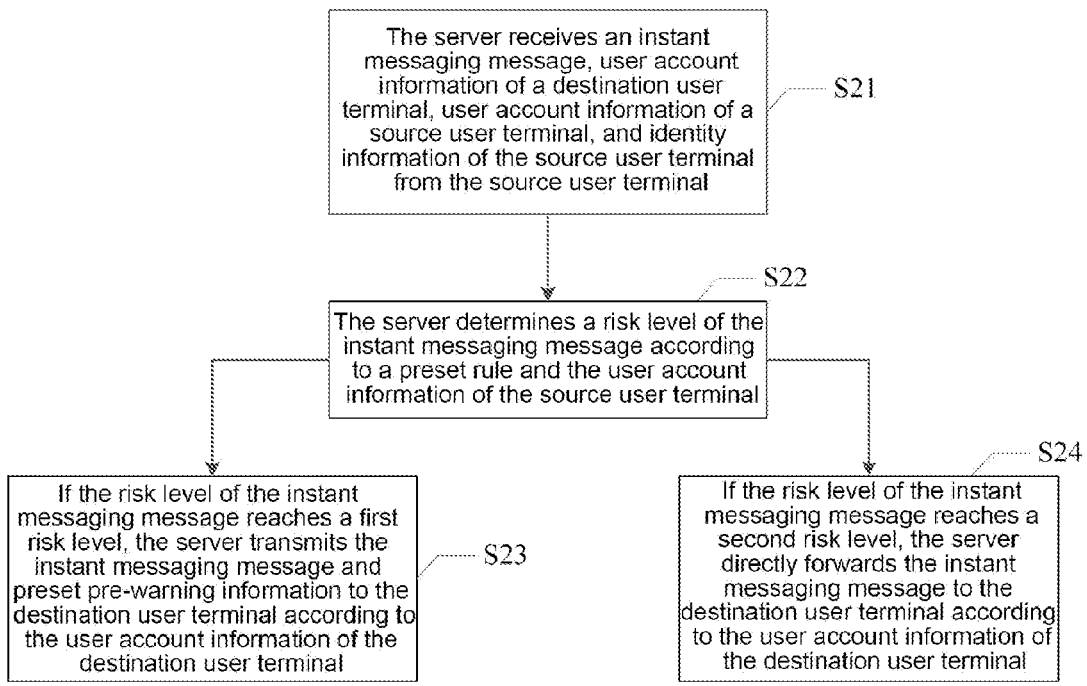
FIG. 3 is a flow chart of an instant messaging message processing method provided by a second embodiment of the present disclosure.

FIG. 3 is a flow chart of an instant messaging message processing method provided by the second embodiment of the present disclosure. In this embodiment, the risk level of the instant messaging message is determined with further combination with obtained identity information of the source user terminal 101, to determine the risk level of the instant messaging message more accurately.

The identity information of the source user terminal 101 is used for uniquely identifying the identity of the source user terminal 101, and may particularly include one of or any combination of at least two of: an Internet Protocol (IP) address, a machine identification code, and a Media Access Control (MAC) address of the source user terminal. The server 102 can receive and obtain the identity information of the source user terminal 101 upon receiving an instant messaging message transmitted by the source user terminal 101.

As shown in FIG. 3, the instant messaging message processing method of the present embodiment includes following Steps S21 to S24.

Step S21: the server receives from a source user terminal an instant messaging message, user account information of a destination user terminal, user account information of the source user terminal, and identity information of the source user terminal.

For particulars of this step, reference may be made to corresponding contents of the first embodiment, which will not be described again here.

Step S22: the server determines a risk level of the instant messaging message according to a preset rule and the user account information of the source user terminal.

Figure 4:
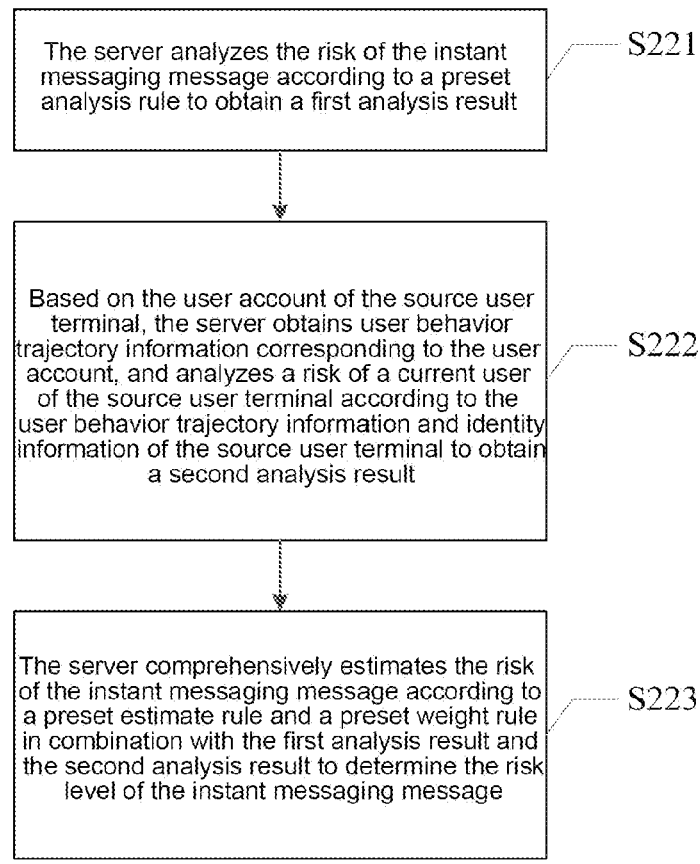
FIG. 4 is a flow chart showing details of some steps in the instant messaging message processing method provided by the second embodiment of the present disclosure.

As shown in FIG. 4, this step may particularly include following Steps S221 to S223.

Step S221: the server analyzes the risk of the instant messaging message according to a preset analysis rule to obtain a first analysis result.

In a specific implementation of this embodiment, as regulated by the preset analysis rule, a keyword in the instant messaging message is analyzed. The keyword may be a word or a phrase both including treasure information, such as credit card, transferring accounts, sending money, and borrowing money. Each keyword may be preset with a corresponding weight according to importance of the keyword.

Particularly, the server 102 extracts text content included in the instant messaging message, and determines whether a preset keyword is included in the extracted text content to obtain the first analysis result. The first analysis result may indicate: whether a keyword is included in the extracted text, and if so, which keywords are included, and respective weights of the keywords included.

Step S222: based on the user account of the source user terminal, the server obtains user behavior trajectory information corresponding to the user account, and analyzes a risk of a user currently using the source user terminal according to the user behavior trajectory information and the obtained identity information of the source user terminal, to obtain a second analysis result.

The user behavior trajectory information may include one of or any combination of at least two of: a common location of the login of the user account, an identifier of a user terminal commonly used for the login of the user account, a theft record of the user account, and a violative information release record of the user account.

The server 102 analyzes the risk of a current user of the source user terminal 101 according to the user behavior trajectory information and the identity information of the source user terminal 101, to obtain the second analysis result. The second analysis result may include, for example, one of or any combination of at least two of: whether the location of the source user terminal 101 is the same as the common location of the login of the same user account, whether an identifier of the source user terminal 101 is in consistent with the identifier of a user terminal commonly used for the login of the same user account, whether the user account was stolen, and whether the current user released violative information (such as pornographic information, information endangering public security, and fraud information) by using the same user account.

Step S223: the server comprehensively estimates the risk of the instant messaging message according to a preset estimate rule and a preset weight rule in combination with the first analysis result and the second analysis result, to determine the risk level of the instant messaging message.

In a specific implementation of this embodiment, corresponding weights may be respectively preset for the first analysis result and the second analysis result, so that the server 102 comprehensively estimates the risk of the instant messaging message according to the preset estimate rule and the preset weight rule in combination with the first analysis result and the second analysis result, and determines the risk level of the instant messaging message according to a preset pre-warning value. If a score value resulting from the comprehensive estimation is larger than or equal to the preset pre-warning value, the risk of the instant messaging message is determined as low and belongs to the first risk level, and the pre-warning information is needed to be transmitted to the destination user terminal 103; and if a score value resulting from the comprehensive estimation is less than the preset pre-warning value, the risk of the instant messaging message is determined as high and belongs to the second risk level, thus there is no need to transmit the pre-warning information to the destination user terminal 103. For example, the first analysis result indicates that the instant messaging message includes three keywords, i.e. urgency, borrow, and money, there are two occurrences of the keyword "money", and weights of these three keywords are 0.5, 1 and 3 respectively; the second analysis result shows that the source user terminal transmitting this instant messaging message is not the user terminal commonly used with the user account, and a preset corresponding weight of this case is 5; thus, based on the preset estimate rule, the comprehensive score of the instant messaging message is 0.5+1+3*2+5=12.5. Assuming that the preset pre-warning value is 10, the risk level of the instant messaging message is determined as low and belongs to the first risk level considering that the comprehensive score of the instant messaging message is greater than the pre-warning value.

Step S23: when the risk level of the instant messaging message reaches the first risk level, the server transmits the instant messaging message along with the preset pre-warning information to the destination user terminal according to the user account information of the destination user terminal, where the pre-warning information includes security prompt information, which is used for prompting a user of the destination user terminal to notice a security risk of the instant messaging message.

In a specific implementation of this embodiment, the pre-warning information further includes verification information and report information. The verification information is used for allowing the destination user terminal 103 to transmit, according to a user operation, a preset identity verification question to the source user terminal 101 to verify the identity of the current user of the source user terminal 101, or allowing the destination user terminal 103 to call, according to a user operation, the source user terminal 101 to verify the identity of the current user of the source user terminal 101. The report information is used for allowing the destination user terminal 103 to report, according to a preset report approach, the instant messaging message as per a corresponding user operation.

The above verification information used for the identity verification is preferably applicable to an instant messenger of a web page version on a personal computer (PC), and the above verification approach based on calling is preferably applicable to an instant messenger of a version for an intelligent terminal with a dialing function.

Step S24: when the risk level of the instant messaging message reaches the second risk level, the server directly forwards the instant messaging message to the destination user terminal according to the user account information of the destination user terminal.

With the instant messaging message processing method provided by the present embodiment of the disclosure, the server determines the risk level of the instant messaging message received from the source user terminal according to a preset rule and the user account information of the source user terminal, and transmits the instant messaging message along with the preset pre-warning information to the destination user terminal according to the user account information of the destination user terminal if the risk level of the instant messaging message reaches the first risk level. Since the risk level of the instant messaging message is determined from multiple dimensionalities such as the preset rule and the user account information of the user terminal, the accuracy of determining the security risk level of the instant messaging message is improved. Further, by transmitting the pre-warning information to the destination user terminal while transmitting the instant messaging message with a high security risk to the destination user terminal, the pre-warning is more accurately targeted, thereby improving the accuracy of the security pre-warning, and effectively reducing the security risks brought to the user of the destination user terminal caused by a risky instant messaging message, thus achieving higher accuracy of the security pre-warning.

Figure 5:
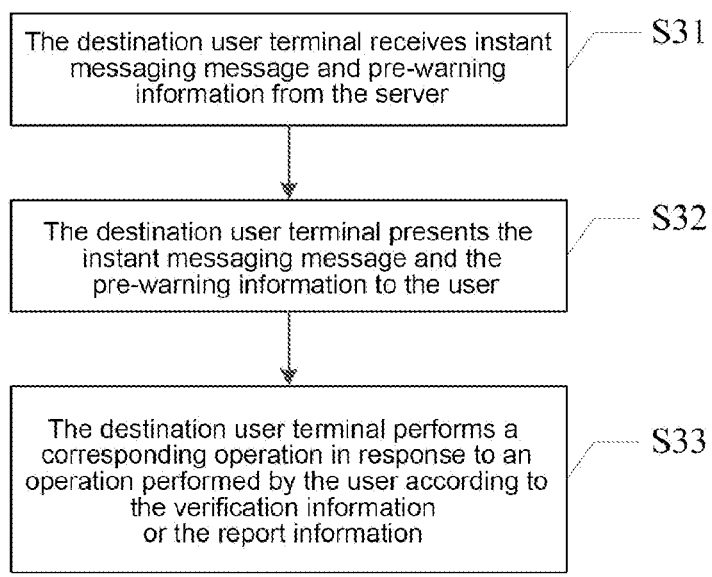
FIG. 5 is a flow chart of an instant messaging message processing method provided by a third embodiment of the present disclosure.

FIG. 5 is a flow chart of an instant messaging message processing method provided by the third embodiment of the present disclosure. As shown in FIG. 5, the instant messaging message processing method of this embodiment includes following Steps S31 to S33.

Step S31: the destination user terminal receives the instant messaging message and the pre-warning information transmitted by the server, where the pre-warning information includes the security prompt information, the verification information and the report information, and the security prompt information is used for prompting a user of the destination user terminal to notice a security risk of the instant messaging message.

Step S32: the destination user terminal presents the instant messaging message and the pre-warning information to the user.

Step S33: the destination user terminal performs a corresponding operation in response to an operation performed by the user according to the verification information or the report information.

Figure 6:
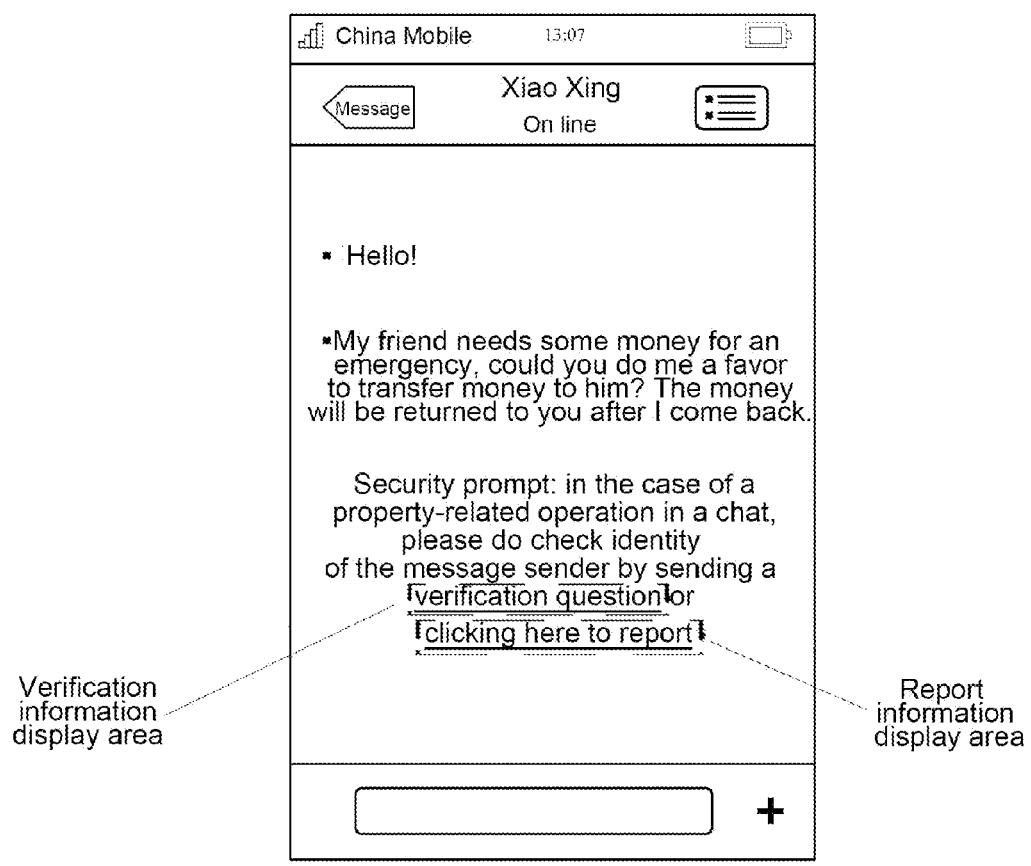
FIG. 6 is a schematic diagram of pre-warning information in the instant messaging message processing method provided by the third embodiment of the present disclosure.

In a specific implementation of this embodiment, Step S33 may particularly include that: the destination user terminal transmits the preset identity verification question to the source user terminal through the server in response to the operation performed by the user according to the verification information, so as to verify the identity of the current user of the source user terminal corresponding to the instant messaging message. The identity verification question and a corresponding answer may be preset by the current user of the destination user terminal. The destination user terminal may transmit the preset identity verification question to the counterpart (i.e. the source user terminal corresponding to the instant messaging message) through the server in response to a user click operation in a verification information display area as shown in FIG. 6, and then judge whether an answer returned by the counterpart is correct according to the preset answer. Or, the user presets the identity verification question merely, and the destination user terminal transmits the preset identity verification question to the counterpart through the server according to an operation of the user, and then displays an answer returned by the counterpart for the user, so that the user can judge whether the returned answer is correct.

Figure 7:
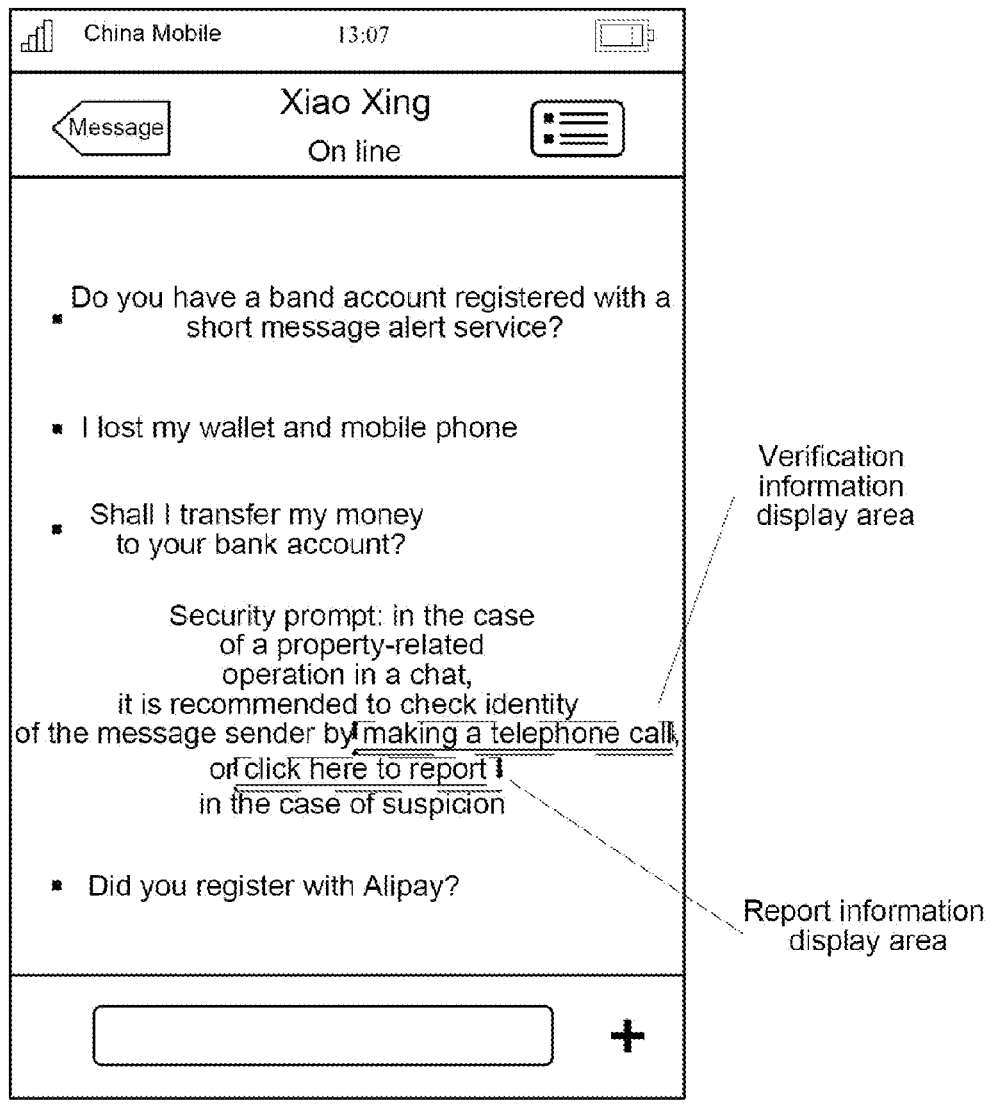
FIG. 7 is another schematic diagram of pre-warning information in the instant messaging message processing method provided by the third embodiment of the present disclosure.

Alternatively, the destination user terminal calls (i.e. dials) the source user terminal in response to an operation performed by the user according to the verification information, to verify the identity of the current user of the source user terminal. Particularly, in response to a user click operation in the verification information display area as shown in FIG. 7, the destination user terminal may invoke a telephone book module and dial a telephone number associated with the source user terminal, or invoke a keyboard and call the source user terminal according to a telephone number input by the user. It could be understood that the server can transmit different verification information to the destination user terminal depending on the type of the destination user terminal. For example, the verification information used for identity verification conducted through dialing is transmitted to the destination user terminal which is a mobile terminal with a telephone function (such as a mobile phone), while the verification information used for identity verification conducted through transmitting an identity verification question is transmitted to the destination user terminal which is a computer terminal without a telephone function.

Alternatively, in response to an operation conducted by the user according to the report information, the destination user terminal reports the instant messaging message according to the preset report approach. For example, in response to a user click operation in a report information display area as shown in FIG. 6 or FIG. 7, the destination user terminal transmits the instant messaging message and personal information of the user of the source user terminal preset by the user to an alarming mailbox of the National Information Security Center.

According to the instant messaging message processing method provided by the present embodiment of the disclosure, both the instant messaging message and the pre-warning information transmitted by the server are received by the destination user terminal, where the pre-warning information includes the security prompt information, the verification information and the report information, and the security prompt information is used for prompting a user of the destination user terminal to notice a security risk of the instant messaging message. Further, the destination user terminal presents the instant messaging message and the pre-warning information to the user, and performs a corresponding operation in response to an operation performed by the user according to the verification information or the report information, so that the pre-warning is more accurately targeted, the effect of the pre-warning is improved, and the security risk brought to the receiving user by a risky instant messaging message is effectively reduced. Moreover, the corresponding operation is performed by the destination user terminal according to an operation performed by the user based on the verification information or the report information, the flexibility of the security prompt about the instant messaging message is improved, thereby avoiding unnecessary trouble brought to the sending user of the instant messaging message by machine misjudgments.

Figure 8:
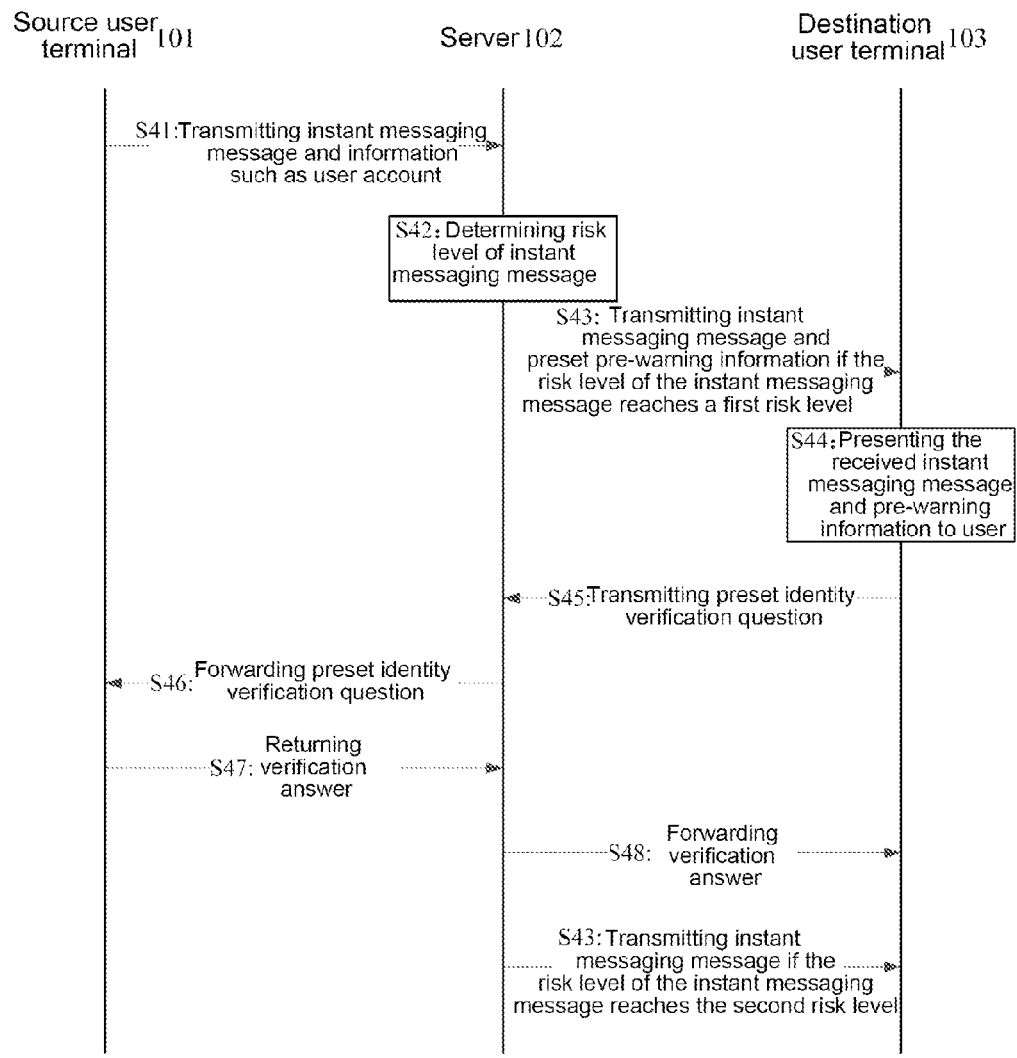
FIG. 8 is a flow chart of an instant messaging message processing method provided by a fourth embodiment of the present disclosure.

FIG. 8 is a flow chart of an instant messaging message processing method provided by the fourth embodiment of the present disclosure. As shown in FIG. 8, the instant messaging message processing method of this embodiment includes following Steps S41 to S48.

Step S41: the source user terminal 101 obtains the instant messaging message input by the user, and transmits the obtained instant messaging message, the user account information of the destination user terminal 103, the user account information of the source user terminal 101 and the identity information of the source user terminal 101 to the server 102.

Step S42: the server 102 determines the risk level of the instant messaging message according to a preset rule and the user account information of the source user terminal.

When the risk level of the instant messaging message reaches the first risk level, the server 102 executes Step S43 of: transmitting the instant messaging message and the preset pre-warning information to the destination user terminal 103 according to the user account information of the destination user terminal 103, where the pre-warning information includes the security prompt information, which is used for prompting a user of the destination user terminal to notice a security risk of the instant messaging message.

For particulars of Steps S41 to S42, reference may be made to corresponding contents of the first embodiment and the second embodiment, which are not described again here.

Step S44: the destination user terminal 103 presents the received instant messaging message and the pre-warning information to the user.

Step S45: the destination user terminal 103 transmits the preset identity verification question to the server 102 in response to an operation performed by the user according to the verification information.

Step S46: the server 102 forwards the preset identity verification question to the source user terminal 101 to verify the identity of the current user of the source user terminal 101.

Step S47: the source user terminal 101 displays the preset identity verification question to the user of the source user terminal 101, obtains a verification answer that is input by the user according to the preset identity verification question, and returns the obtained verification answer to the server 102.

Step S48: the server 102 forwards the verification answer to the destination user terminal 103 so that the user of the destination user terminal 103 verifies the identity of the current user of the source user terminal 101.

In a specific implementation of this embodiment, the destination user terminal 103 can also call the source user terminal 101 in response to an operation performed by the user according to the verification information, to verify the identity of the current user of the source user terminal 101.

In another specific implementation of this embodiment, the destination user terminal 103 can also report the instant messaging message according to the preset report approach, in response to an operation performed by the user according to the report information.

When the risk level of the instant messaging message reaches the second risk level, the server 102 executes Step S49 of: forwarding the instant messaging message to the destination user terminal 103 according to the user account information of the destination user terminal 103.

With the instant messaging message processing method provided by the present embodiment of the disclosure, the server determines the risk level of the instant messaging message received from the source user terminal according to a preset rule and the user account information of the source user terminal, and transmits the instant messaging message along with the preset pre-warning information to the destination user terminal according to the user account information of the destination user terminal if the risk level of the instant messaging message reaches the first risk level. Since the risk level of the instant messaging message is determined from multiple dimensionalities such as the preset rule and the user account information of the user terminal, the accuracy of determining the security risk level of the instant messaging message is improved. Further, by transmitting the pre-warning information to the destination user terminal while transmitting the instant messaging message with a high security risk to the destination user terminal, the pre-warning is more accurately targeted, thereby improving the accuracy of the security pre-warning, and effectively reducing the security risks brought to the user of the destination user terminal caused by a risky instant messaging message, thus achieving higher accuracy of the security pre-warning.

Figure 9:
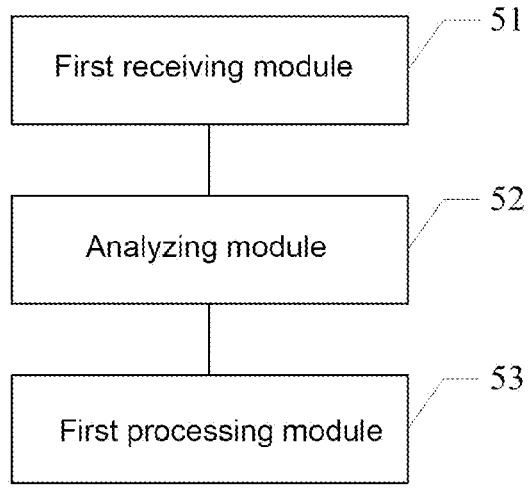
FIG. 9 is a schematic structural diagram of an instant messaging message processing device provided by a fifth embodiment of the present disclosure.

FIG. 9 is a schematic structural diagram of an instant messaging message processing device provided by the fifth embodiment of the present disclosure. The instant messaging message processing device provided by this embodiment is operatable on a server, and may be used for embodying the instant messaging message processing methods described in the above embodiments. As shown in FIG. 9, an instant messaging message processing device 50 includes a first receiving module 51, an analyzing module 52 and a first processing module 53.

The first receiving module 51 is configured to receive an instant messaging message, user account information of a destination user terminal, and user account information of a source user terminal from the source user terminal.

The analyzing module 52 is configured to determine a risk level of the instant messaging message according to a preset rule, and the user account information of the source user terminal.

The first processing module 53 is configured to transmit the instant messaging message along with preset pre-warning information to the destination user terminal according to the user account information of the destination user terminal if the analyzing module 52 determines that the risk level of the instant messaging message reaches the first risk level, where the pre-warning information includes security prompt information, which is used for prompting a user of the destination user terminal to notice a security risk of the instant messaging message.

For specific implementation of each functional module of the instant messaging message processing device 50 in this embodiment, reference may be made to specific contents described in the embodiments shown in FIG. 1 to FIG. 8, which are not described again here.

With the instant messaging message processing device provided by the present embodiment of the disclosure, the server determines the risk level of the instant messaging message received from the source user terminal according to a preset rule and the user account information of the source user terminal, and transmits the instant messaging message along with the preset pre-warning information to the destination user terminal according to the user account information of the destination user terminal if the risk level of the instant messaging message reaches the first risk level. Since the risk level of the instant messaging message is determined from multiple dimensionalities such as the preset rule and the user account information of the user terminal, the accuracy of determining the security risk level of the instant messaging message is improved. Further, by transmitting the pre-warning information to the destination user terminal while transmitting the instant messaging message with a high security risk to the destination user terminal, the pre-warning is more accurately targeted, thereby improving the accuracy of the security pre-warning, and effectively reducing the security risks brought to the user of the destination user terminal caused by a risky instant messaging message, thus achieving higher accuracy of the security pre-warning.

Figure 10:
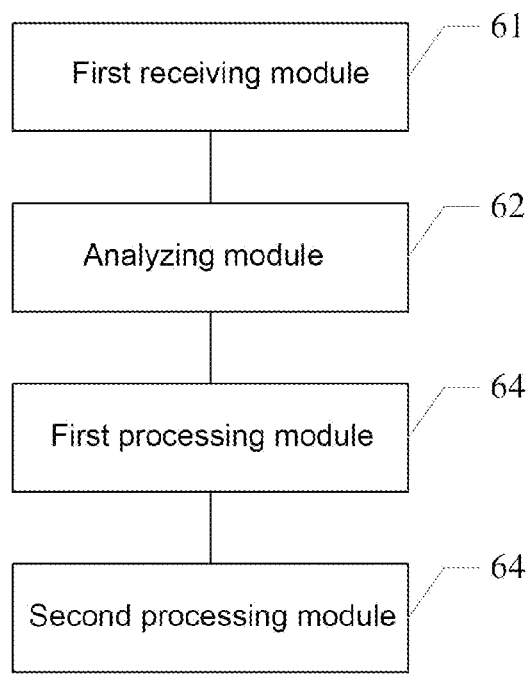
FIG. 10 is a schematic structural diagram of an instant messaging message processing device provided by a sixth embodiment of the present disclosure.

FIG. 10 is a schematic structural diagram of an instant messaging message processing device provided by the sixth embodiment of the present disclosure. The instant messaging message processing device provided by this embodiment is operatable on a server, and may be used for embodying the instant messaging message processing methods described in the above embodiments. As shown in FIG. 10, an instant messaging message processing device 60 includes a first receiving module 61, an analyzing module 62, a first processing module 63 and a second processing module 64.

The first receiving module 61 is configured to receive an instant messaging message, user account information of a destination user terminal, user account information of a source user terminal, and identity information of the source user terminal from the source user terminal.

Preferably, the identity information of the source user terminal includes one of or any combination of at least two of: an IP address, a machine identification code, and a MAC address of the source user terminal.

Figure 11:
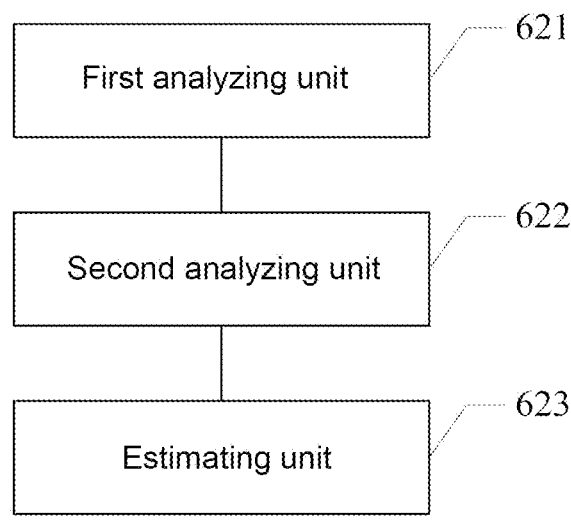
FIG. 11 is a schematic structural diagram of partial modules in the instant messaging message processing device provided by the sixth embodiment of the present disclosure.

The analyzing module 62 is configured to determine the risk level of the instant messaging message according to a preset rule and the user account information of the source user terminal. As shown in FIG. 11, the analyzing module 62 includes a first analyzing unit 621, a second analyzing unit 622 and an estimating unit 623. The first analyzing unit 621 is configured to analyze the risk of the instant messaging message according to the preset analysis rule to obtain a first analysis result; the second analyzing unit 622 is configured to, according to the user account of the source user terminal, obtain user behavior trajectory information corresponding to the user account, and analyze risk of the current user of the source user terminal according to the obtained user behavior trajectory information and the obtained identity information of the source user terminal to obtain a second analysis result; the estimating unit 623 is configured to comprehensively estimate the risk of the instant messaging message according to the preset estimate rule and the preset weight rule in combination with the first analysis result and the second analysis result to determine the risk level of the instant messaging message.

Further, the first analyzing unit 621 may be particularly configured to analyze the content of the instant messaging message, and determine whether a preset keyword is included in the instant messaging message, to obtain the first analysis result.

Preferably, user behavior trajectory information may include one of or any combination of: a common location of the login of the user account, an identifier of a user terminal commonly used for the login of the user account, a theft record of the user account, and a violative information release record of the user account.

The first processing module 63 is configured to transmit the instant messaging message along with the preset pre-warning information to the destination user terminal according to the user account information of the destination user terminal when the analyzing module 62 determines that the risk level of the instant messaging message reaches the first risk level, where the pre-warning information includes the security prompt information, which is used for prompting a user of the destination user terminal to notice a security risk of the instant messaging message.

The second processing module 64 is configured to forward the instant messaging message to the destination user terminal according to the user account information of the destination user terminal if the analyzing module 62 determines that the risk level of the instant messaging message reaches the second risk level.

Preferably, the pre-warning information further includes verification information and report information. The verification information is used for allowing the destination user terminal to transmit, according to a user operation, a preset identity verification question to the source user terminal to verify the identity of the current user of the source user terminal, or allowing the destination user terminal to call, according to a user operation, the source user terminal to verify the identity of the current user of the source user terminal. The report information is used for allowing the destination user terminal to report, according to a preset report approach, the instant messaging message as per a corresponding user operation.

For specific implementation of each functional module of the instant messaging message processing device 60 in this embodiment, reference may be made to specific contents described in the embodiments shown in FIG. 1 to FIG. 8, which are not described again here.

With the instant messaging message processing device provided by the present embodiment of the disclosure, the server determines the risk level of the instant messaging message received from the source user terminal according to a preset rule and the user account information of the source user terminal, and transmits the instant messaging message along with the preset pre-warning information to the destination user terminal according to the user account information of the destination user terminal if the risk level of the instant messaging message reaches the first risk level. Since the risk level of the instant messaging message is determined from multiple dimensionalities such as the preset rule and the user account information of the user terminal, the accuracy of determining the security risk level of the instant messaging message is improved. Further, by transmitting the pre-warning information to the destination user terminal while transmitting the instant messaging message with a high security risk to the destination user terminal, the pre-warning is more accurately targeted, thereby improving the accuracy of the security pre-warning, and effectively reducing the security risks brought to the user of the destination user terminal caused by a risky instant messaging message, thus achieving higher accuracy of the security pre-warning.

Figure 12:
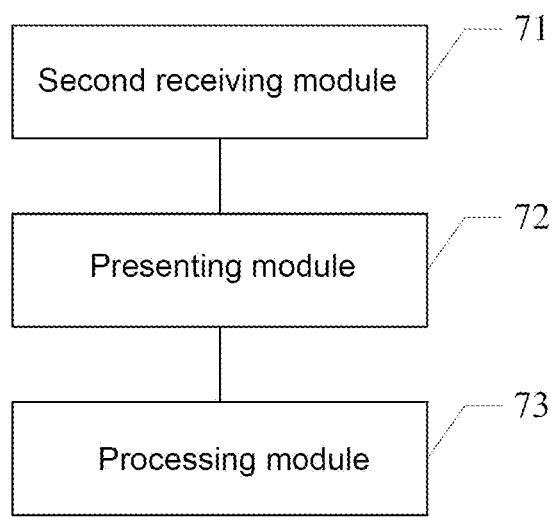
FIG. 12 is a schematic structural diagram of an instant messaging message processing device provided by a seventh embodiment of the present disclosure.

FIG. 12 is a schematic structural diagram of an instant messaging message processing device provided by the seventh embodiment of the present disclosure. The instant messaging message processing device provided by this embodiment is operatable on a destination user terminal, and may be used for embodying the instant messaging message processing methods described in the above embodiments. As shown in FIG. 12, an instant messaging message processing device 70 includes a second receiving module 71, a presenting module 72 and a processing module 73.

The second receiving module 71 is configured to receive an instant messaging message and pre-warning information from the server, where the pre-warning information includes the security prompt information, the verification information and the report information, and the security prompt information is used for prompting a user of the destination user terminal to notice a security risk of the instant messaging message.

The presenting module 72 is configured to present the instant messaging message and the pre-warning information received by the second receiving module 71 to the user.

The processing module 73 is configured to perform a corresponding operation in response to an operation performed by the user according to the verification information or the report information.

For specific implementation of each functional module of the instant messaging message processing device 70 in this embodiment, reference may be made to specific contents described in the above embodiments shown in FIG. 1 to FIG. 8, which are not described again here.

According to the instant messaging message processing method provided by the present embodiment of the disclosure, both the instant messaging message and the pre-warning information transmitted by the server are received by the destination user terminal, where the pre-warning information includes the security prompt information, the verification information and the report information, and the security prompt information is used for prompting a user of the destination user terminal to notice a security risk of the instant messaging message. Further, the destination user terminal presents the instant messaging message and the pre-warning information to the user, and performs a corresponding operation in response to an operation performed by the user according to the verification information or the report information, so that the pre-warning is more accurately targeted, the effect of the pre-warning is improved, and the security risk brought to the receiving user by a risky instant messaging message is effectively reduced. Moreover, the corresponding operation is performed by the destination user terminal according to an operation performed by the user based on the verification information or the report information, the flexibility of the security prompt about the instant messaging message is improved, thereby avoiding unnecessary trouble brought to the sending user of the instant messaging message by machine misjudgments.

Figure 13:
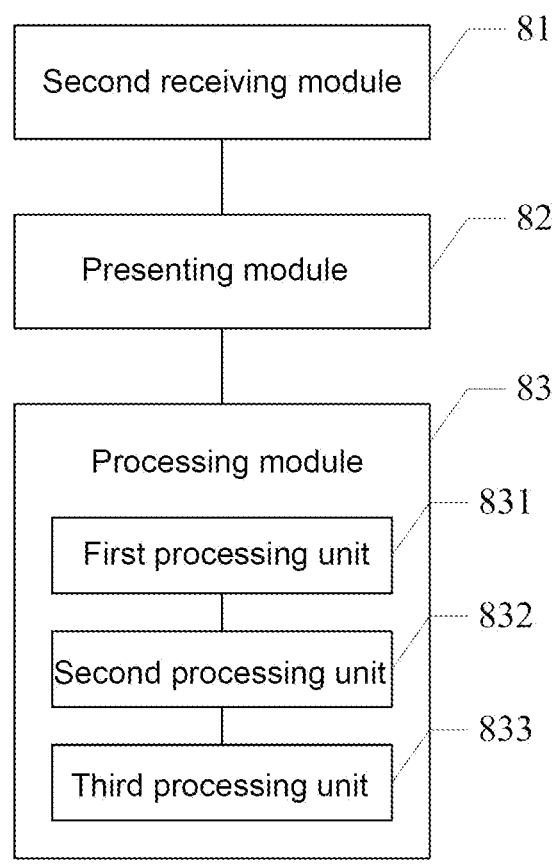
FIG. 13 is a schematic structural diagram of an instant messaging message processing device provided by an eighth embodiment of the present disclosure.

FIG. 13 is a schematic structural diagram of an instant messaging message processing device provided by the eighth embodiment of the present disclosure. The instant messaging message processing device provided by this embodiment is operatable on a user terminal, and may be used for embodying the instant messaging message processing methods described in the above embodiments. As shown in FIG. 13, an instant messaging message processing device 80 includes a second receiving module 81, a presenting module 82 and a processing module 83.

The second receiving module 81 is configured to receive an instant messaging message along with pre-warning information from the server, where the pre-warning information includes security prompt information, verification information and report information, and the security prompt information is used for prompting a user of the destination user terminal to notice a security risk of the instant messaging message.

The presenting module 82 is configured to present the instant messaging message and the pre-warning information received by the second receiving module 81 to the user.

The processing module 83 is configured to perform a corresponding operation in response to an operation performed by the user according to the verification information or the report information. The processing module 83 includes a first processing unit 831, a second processing unit 832 and a third processing unit 833. The first processing unit 831 is configured to transmit a preset identity verification question to the source user terminal through the server in response to an operation performed by the user according to the verification information, to verify the identity of the current user of the source user terminal corresponding to the instant messaging message; the second processing unit 832 is configured to call the source user terminal in response to an operation performed by the user according to the verification information, so as to verify the identity of the current user of the source user terminal; the third processing unit 833 is configured to report the instant messaging message according to the preset report approach in response to an operation performed by the user according to the report information.

For specific implementation of each functional module of the instant messaging message processing device 80 in this embodiment, reference may be made to specific contents described in the embodiments shown in FIG. 1 to FIG. 8, which are not described again here.

Through the instant messaging message processing device provided by the present embodiment of the disclosure, both the instant messaging message and the pre-warning information are received by the user terminal from the server, where the pre-warning information includes the security prompt information, the verification information and the report information, and the security prompt information is used for prompting a user of the destination user terminal to notice a security risk of the instant messaging message. Further, the user terminal presents the instant messaging message and the pre-warning information to the user and performs a corresponding operation in response to an operation performed by the user according to the verification information or the report information, so that the pre-warning is more accurately targeted, and the accuracy of the pre-warning is improved, thereby effectively reducing the security risks brought to a user of the destination user terminal by a risky instant messaging message and resulting in higher accuracy of the security pre-warning.

Figure 14:
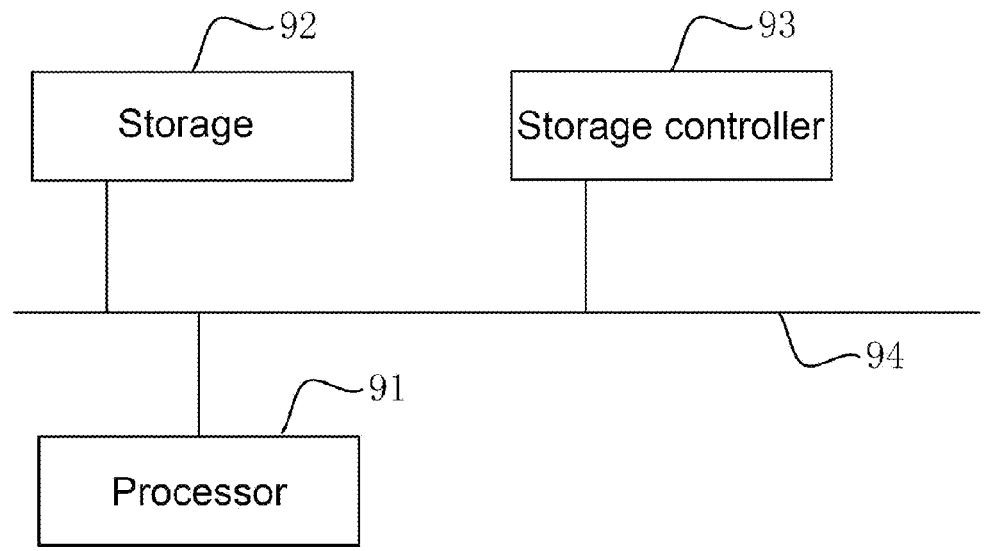
FIG. 14 is a schematic structural diagram of a server provided by a ninth embodiment of the present disclosure.

FIG. 14 is a schematic structural diagram of a server provided by the ninth embodiment of the present disclosure, and the server includes a processor 91, a storage 92 and a storage controller 93.

There may be one or more of the processors 91, and merely one processor 91 is shown in FIG. 14. Various components in the server can be connected through one or more buses or signal lines, and a bus 94 is illustratively employed for the connection in FIG. 14.

As a computer readable storage medium, the storage 92 may be configured to store a software program, a computer executable program and modules, such as program instructions/modules (for example, the first receiving module, the analyzing module and the first processing module in the instant messaging message processing device) corresponding to the instant messaging message processing method in the embodiments of the present disclosure. The processor 91 is configured to perform various functional applications and data processing on the server, namely, embody the above instant messaging message processing method at the side of the server by executing the software programs, instructions and modules stored in the storage 92.

The processor 91 can perform the following steps that:
the server receives an instant messaging message, user account information of a destination user terminal, and user account information of a source user terminal from the source user terminal;
the server determines a risk level of the instant messaging message according to a preset rule, and the user account information of the source user terminal; and
if the risk level of the instant messaging message reaches the first risk level, the server transmits the instant messaging message along with preset pre-warning information to the destination user terminal according to the user account information of the destination user terminal, where the pre-warning information includes the security prompt information, which is used for prompting a user of the destination user terminal to notice a security risk of the instant messaging message.

In an implementation, the processor 91 can execute the instant messaging message processing method operatable at the server side and provided by any of the embodiments of the present disclosure.

Figure 15:
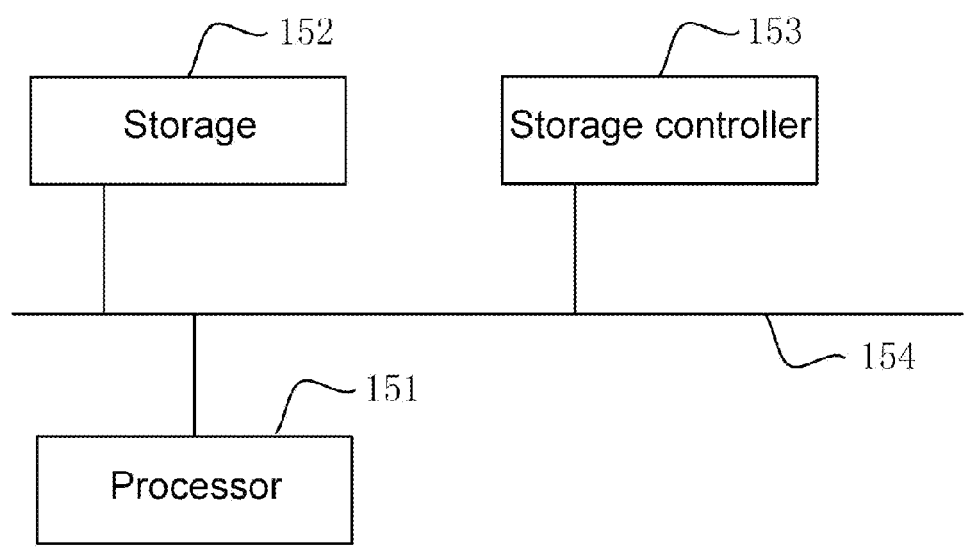
FIG. 15 is a schematic structural diagram of a user terminal provided by a tenth embodiment of the present disclosure.

FIG. 15 is a schematic structural diagram of a user terminal provided by a tenth embodiment of the present disclosure, and the user terminal includes a processor 151, a storage 152 and a storage controller 153.

There may be one or more of the processors 151, but merely one processor 151 is shown for example in FIG. 15. Various components in the user terminal can be connected through one or more buses or signal lines, and the bus 154 is employed for example for the connection in FIG. 15.

As a computer readable storage medium, the storage 152 may be configured to store a software program, a computer executable program and modules, such as program instructions/modules (for example, the second receiving module, the presenting module and the processing module in the instant messaging message processing device) corresponding to the instant messaging message processing method in the embodiments of the present disclosure. The processor 151 is configured to perform various functional applications and data processing on the user terminal, namely, implement the above instant messaging message processing method operatable at the side of the destination user terminal by executing the software programs, instructions and modules stored in the storage 152.

The processor 151 can execute the following steps that:

the destination user terminal receives the instant messaging message and the pre-warning information transmitted by the server, where the pre-warning information includes the security prompt information, the verification information and the report information, and the security prompt information is used for prompting a user of the destination user terminal to notice a security risk of the instant messaging message;

the destination user terminal presents the instant messaging message and the pre-warning information to the user; and the destination user terminal performs a corresponding operation in response to an operation performed by the user according to the verification information or the report information.

Preferably, the processor 151 can execute the instant messaging message processing method operatable at the destination user terminal side as provided by any of the embodiments of the present disclosure.

It could be understood that structures shown in FIG. 14 and FIG. 15 are only exemplary, and the server or the user terminal may include more or less components than what are shown in FIG. 14 or FIG. 15, or have configurations different from what are shown in FIG. 14 or FIG. 15. Various components shown in FIG. 14 or FIG. 15 may be implemented by hardware, software or a combination of the hardware and the software.

The storage may include a program storage area and a data storage area, where the program storage area can store an operation system and an application program required by at least one function, while the data storage area can store data and the like created in the use of the server. In addition, the storage may include a high-speed random access memory, and may also include a nonvolatile memory, such as at least one disc storage device, a flash memory or other volatile solid-state storage device. In some embodiments, the storage may further include a storage which is arranged remotely from the processor, and the remote storage can be connected to the server or the user terminal through a network. Examples of the network include but are not limited to the Internet, an intranet, a local area network, a mobile communication network and a combination thereof. Access to the storage by the processor and other possible components may be achieved under the control of the storage controller.

In some embodiments, the processor and the storage controller may be implemented in a single chip; in some other embodiments, the processor and the storage controller may be implemented by individual chips, respectively.

An embodiment of the present disclosure further provides a storage medium including computer-executable instructions, which, when being executed by a computer processor, are configured to execute an instant messaging message processing method including:

receiving, by a server, an instant messaging message, user account information of a destination user terminal, and user account information of a source user terminal from the source user terminal;

determining, by the server, the risk level of the instant messaging message according to a preset rule and the user account information of the source user terminal; and if the risk level of the instant messaging message reaches a first risk level, transmitting, by the server, the instant messaging message along with preset pre-warning information to the destination user terminal according to the user account information of the destination user terminal, where the pre-warning information includes security prompt information, which is used for prompting a user of the destination user terminal to notice a security risk of the instant messaging message.

An embodiment of the present disclosure further provides a storage medium including computer-executable instructions, which, when being executed by a computer processor, are configured to execute an instant messaging message processing method including:

receiving, by the destination user terminal, the instant messaging message and the pre-warning information transmitted by the server, where the pre-warning information includes the security prompt information, the verification information and the report information, and the security prompt information is used for prompting a user of the destination user terminal to notice a security risk of the instant messaging message;

presenting, by the destination user terminal, the instant messaging message and the pre-warning information to the user; and performing, by the destination user terminal, a corresponding operation in response to an operation performed by the user according to the verification information or the report information.

For the storage medium including computer-executable instructions provided by the embodiment of the present disclosure, preferably, when the computer-executable instructions are executed by the computer processor, the computer-executable instructions may execute the instant messaging message processing method provided by any of the embodiments of the present disclosure.

It should be noted that each subsequent embodiment is described in a progressive manner; that is, the embodiment is mainly described in terms of its difference from the previous embodiment(s), and reference may be made to the previous embodiment(s) for the same or similar parts with the previous embodiment(s). Descriptions of the devices are relatively simple considering their similarity to the corresponding method, and reference may be made to the corresponding part of the description of the method embodiments for respective parts of the device.

It should be noted that relation terms such as first, second and the like are only used for distinguishing an entity or operation from another entity or operation, but not necessarily describing or implying any actual relation or order present among these entities or operations. In addition, terms "include", "comprise" or any other variants thereof intend to mean a non-exclusive inclusion, which means that processes, methods, goods or devices including a series of elements include not only those elements but also other elements not listed explicitly or inherent elements of the processes, the methods, the goods or the devices. An element defined by the statement "include a . . . " does not exclude additional same elements in the processes, the methods, the goods or the devices including the element, if not otherwise defined.

Those of ordinary skill in the art can understand that all or part of the steps achieving the above embodiments can be accomplished through hardware or through instructing corresponding hardware by a program, the program can be stored in a computer readable storage medium such as a read-only memory, a disk or a compact disc.

The above are only preferred specific embodiments of the present disclosure, and the present disclosure is not limited thereto. Though the present disclosure is disclosed as above with reference to the preferred embodiments, the embodiments are not used for limiting the present disclosure. In light of the technical content disclosed above, modifications or equivalents may be made by those skilled in the art without departing from the scope of technical schemes of the present disclosure. Such modifications and equivalents made to the above embodiments based on technical essence of the present disclosure without departing from technical scheme content of the present disclosure all fall within the scope of technical schemes of the present disclosure.

The invention claimed is:

1. An instant messaging message processing method, comprising:
 receiving, by a server, an instant messaging message, user account information of a destination user terminal, and user account information of a source user terminal from the source user terminal, the source user terminal and the destination user terminal each comprising at least one processor executing an instant messaging application;
 determining, by the server, a risk level of the instant messaging message according to content of the instant messaging message and the user account information of the source user terminal; and
 after the server determines that the risk level of the instant messaging message reaches a first risk level, transmitting, by the server, the instant messaging message along with a pre-warning information to the destination user terminal according to the user account information of the destination user terminal,
 wherein:
 the pre-warning information is displayed by the instant messaging application on the destination user terminal, and comprises security prompt information and verification information,
 the verification information is displayed as a selectable control in the instant messaging application on the destination user terminal, and when the selectable control is selected, the destination user terminal is triggered to perform one of: sending a verification request to the server for conducting identity verification with the source user terminal or invoking a dialing function for making a telephone call to the source user terminal, and
 determining, by the server, the risk level of the instant messaging message further comprises:
 identifying, by the server, whether the source user terminal exhibits one or more preset type of event based on a user account of the source user terminal, user behavior trajectory information corresponding to the user account, and identity information of the source user terminal to obtain a first analysis result, wherein when the one or more preset type of event is identified, the first analysis result is generated based on preset weight information corresponding to the one or more identified preset type of event; and
 determining, by the server, the risk level of the instant messaging message based on the first analysis result.

2. The method according to claim 1, wherein determining by the server a risk level of the instant messaging message according to content of the instant messaging message and the user account information of the source user terminal comprises:
 analyzing, by the server, the content of the instant messaging message according to a preset analysis rule to obtain a second analysis result;
 determining, by the server, the risk level of the instant messaging message based on a combination of the first analysis result and the second analysis result.

3. The method according to claim 1, wherein,
 the identity information of the source user terminal obtained by the server for determining the risk level comprises one of or any combination of at least two of: an IP address, a machine identification code, and a MAC address of the source user terminal.

4. The method according to claim 2, wherein the analyzing by the server the content of the instant messaging message according to a preset analysis rule to obtain a second analysis result comprises:
 matching, by the server, the content of the instant messaging message with a plurality of preset keywords and determining whether at least one preset keyword is comprised in the instant messaging message, to obtain the second analysis result,
 wherein when the at least one preset keyword is found in the content, the second analysis result is generated based on preset weight information corresponding to the at least one matched preset keyword included in the content.

5. The method according to claim 3, wherein, the user behavior trajectory information comprises one of or any combination of: a common location of the login of the user account by the user, an identifier of a user terminal commonly used by the user for the login of the user account, a theft record of the user account, and a violative information release record of the user account.

6. The method according to claim 1, further comprising:
 if the risk level of the instant messaging message reaches a second risk level, forwarding, by the server, the instant messaging message to the destination user terminal without the preset pre-warning information according to the user account information of the destination user terminal.

7. The method according to claim 1, wherein, the pre-warning information further comprises report information; and the report information is used for allowing the destination user terminal to report, according to a preset report approach, the instant messaging message as per a corresponding user operation.

8. The method according to claim 1, further comprising:
 receiving, by the server, the verification request from the destination user terminal;

transmitting, by the server, an identity verification question to the source user terminal, the identity verification question being preset by the user account of the destination user terminal;
receiving, by the server, an answer returned by the source user terminal; and
verifying the source terminal by determining whether the answer is correct.

9. The method according to claim 8, wherein:
a correct answer corresponding to the identity verification question is preset by the user account of the destination user terminal and saved on the server, and the server determines whether the answer from the source user terminal is correct based on the preset correct answer; or
the server transmits the answer to the destination user terminal for a user of the destination user terminal to determine whether the answer is correct.

10. The method according to claim 1, wherein:
the user behavior trajectory information corresponding to the user account includes an identifier of a user terminal commonly used for login of the user account with the instant messaging application; and
the one or more preset type of event includes: the identity information of the source user terminal is different from the identifier of the user terminal commonly used for login of the user account with the instant messaging application.

11. The method according to claim 1, wherein transmitting the instant messaging message along with the pre-warning information further comprises:
determining, by the server, the verification information based on a type of the destination user terminal;
when the destination user terminal is a mobile phone, transmitting the verification information configured for invoking the dialing function;
when the destination user terminal is a computer, transmitting the verification information configured for sending the verification request.

12. An instant messaging message processing method, comprising:
receiving, by a destination user terminal comprising at least one processor executing an instant messaging application, an instant messaging message and pre-warning information from a server, wherein the pre-warning information comprises security prompt information, verification information and report information, and the security prompt information is used for prompting a user of the destination user terminal to notice a security risk of the instant messaging message;
presenting, by the destination user terminal, the instant messaging message and the pre-warning information to the user; and
performing a corresponding operation, by the destination user terminal, in response to an operation performed by the user according to the verification information or the report information;
wherein the verification information is displayed as a selectable control in the instant messaging application on the destination user terminal, and when the selectable control is selected, the destination user terminal is triggered to perform one of: sending a verification request to the server for conducting identity verification with the source user terminal or invoking a dialing function for making a telephone call to the source user terminal, and the risk level of the instant messaging message is determined by the server, including: identifying whether the source user terminal exhibits one or more preset type of event based on a user account of the source user terminal, user behavior trajectory information corresponding to the user account, and identity information of the source user terminal; and determining the risk level of the instant messaging message based on preset weight information corresponding to the one or more identified preset type of event.

13. The method according to claim 12, wherein the performing a corresponding operation by the destination user terminal in response to an operation performed by the user according to the verification information or the report information comprises:
transmitting, by the destination user terminal, the preset identity verification question to the source user terminal through the server in response to an operation that is performed by the user according to the verification information, to verify the identity of the current user of the source user terminal corresponding to the instant messaging message; or
calling, by the destination user terminal, the source user terminal in response to an operation that is performed by the user of the destination user terminal according to the verification information, to verify the identity of the current user of the source user terminal; or
report, by the destination user terminal, the instant messaging message according to the report information to as per a preset report approach in response to an operation that is made by the user of the destination user terminal.

14. An instant messaging message processing device operable on a server, comprising: at least one processor configured to:
receive an instant messaging message, user account information of a destination user terminal, and user account information of a source user terminal from the source user terminal;
determine a risk level of the instant messaging message according to content of the instant messaging message and the user account information of the source user terminal; and
transmit the instant messaging message along with preset pre-warning information to the destination user terminal according to the user account information of the destination user terminal after the server determines that the risk level of the instant messaging message reaches a first risk level,
wherein:
the pre-warning information is displayed by the instant messaging application on the destination user terminal, and comprises security prompt information and verification information,
the verification information is displayed as a selectable control in the instant messaging application on the destination user terminal, and when the selectable control is selected, the destination user terminal is triggered to perform one of: sending a verification request to the server for conducting identity verification with the source user terminal or invoking a dialing function for making a telephone call to the source user terminal, and
the at least one processor is further configured to:
identify whether the source user terminal exhibits one or more preset type of event based on a user account of the source user terminal, user behavior trajectory information corresponding to the user account, and identity information of the source user terminal to obtain a first analysis result, wherein when the one or more preset type of event is identified, the first analysis result is generated based on preset weight information corresponding to the one or more identified preset type of event; and determine the risk level of the instant messaging message based on the first analysis result.

15. The device according to claim 14, wherein, the at least one processor is further configured to:

analyze the content of the instant messaging message according to a preset analysis rule to obtain a second analysis result;

determine the risk level of the instant messaging message based on a combination of with the first analysis result and the second analysis result.

16. The device according to claim 14, wherein, the identity information of the source user terminal obtained by the server for determining the risk level comprises one of or any combination of at least two of: an IP address, a machine identification code, and a MAC address of the source user terminal.

17. The device according to claim 15, wherein the at least one processor is further configured to, match the content of the instant messaging message with a plurality of preset keywords, and determine whether at least one preset keyword is comprised in the instant messaging message to obtain the second analysis result, wherein when the at least one preset keyword is found in the content, the second analysis result is generated based on preset weight information corresponding to the at least one matched preset keyword included in the content.

18. The device according to claim 16, wherein, the user behavior trajectory information comprises one of or any combination of: a common location of the login of the user account by the user, an identifier of a user terminal commonly used by the user for the login of the user account, a theft record of the user account, and a violative information release record of the user account.

19. The device according to claim 14, wherein the at least one processor is further configured to:

forward the instant messaging message to the destination user terminal without the preset pre-warning information according to the user account information of the destination user terminal if the server determines that the risk level reaches a second risk level.

20. The device according to claim 14, wherein, the pre-warning information further comprises report information; and the report information is used for allowing the destination user terminal to report, according to a preset report approach, the instant messaging message as per a corresponding user operation.

* * * * *